US009453731B2

United States Patent
Vos et al.

(10) Patent No.: US 9,453,731 B2
(45) Date of Patent: Sep. 27, 2016

(54) SYSTEM AND METHOD FOR DETERMINING ORIENTATION RELATIVE TO EARTH

(75) Inventors: David W. Vos, Delaplane, VA (US); Vladislav Gavrilets, Fairfax, VA (US); Damien B. Jourdan, Falls Church, VA (US); Ben T. Ludington, Gainesville, VA (US); Allen D. Wu, Fairfax, VA (US); Keith M. Allen, Centreville, VA (US)

(73) Assignee: ROCKWELL COLLINS CONTROL TECHNOLOGIES, INC., Warrenton, VA (US)

( * ) Notice: Subject to any disclaimer, the term of this patent is extended or adjusted under 35 U.S.C. 154(b) by 0 days.

(21) Appl. No.: 13/487,809

(22) Filed: Jun. 4, 2012

(65) Prior Publication Data
US 2013/0325316 A1 Dec. 5, 2013

(51) Int. Cl.
*G01C 21/24* (2006.01)
*G01C 17/34* (2006.01)

(52) U.S. Cl.
CPC .............. *G01C 17/34* (2013.01); *G01C 21/24* (2013.01)

(58) Field of Classification Search
CPC ....... G04B 49/00; G01C 17/34; G01C 21/24
USPC ............... 33/268; 701/408; 702/150
See application file for complete search history.

(56) References Cited

U.S. PATENT DOCUMENTS

| 6,501,419 | B2 * | 12/2002 | Davis et al. ................. 342/352 |
| 7,518,792 | B2 * | 4/2009 | McWilliams ................. 359/399 |
| 2005/0192719 | A1 * | 9/2005 | Sheikh et al. ................. 701/13 |
| 2011/0077863 | A1 * | 3/2011 | Brace ........................ 701/208 |
| 2012/0173143 | A1 * | 7/2012 | Belenkii et al. ............... 701/513 |
| 2012/0175496 | A1 * | 7/2012 | Vorovitchik .......... G01C 17/34 250/206.2 |

FOREIGN PATENT DOCUMENTS

WO WO 2011036662 A1 * 3/2011

* cited by examiner

*Primary Examiner* — Nga X Nguyen
(74) *Attorney, Agent, or Firm* — Finnegan, Henderson, Farabow, Garrett & Dunner LLP (57) ABSTRACT

A system for determining the orientation of a fixture relative to the Earth includes at least one sensor configured to detect a celestial body and provide signals indicative of a plurality of positions of a detected celestial body relative to the sensor over a period of time. The system further includes a processor configured to receive information relating to a time and date associated with the period of time during which the celestial body is detected, and information relating to an expected relationship between the detected celestial body and the Earth at the time and date. The processor is further configured to determine the orientation of the fixture relative to the Earth based on signals from the at least one sensor, and the information relating to the time and date and the expected relationship between the detected celestial body and the Earth at the time and date.

20 Claims, 5 Drawing Sheets

SYSTEM AND METHOD FOR DETERMINING ORIENTATION RELATIVE TO EARTH

FIELD

The present disclosure relates to a system and a method for determining the orientation with respect to the Earth, and in particular, to a system and method for determining the latitude, longitude, azimuth, bank angle, and/or elevation angle with respect to the Earth using celestial bodies.

BACKGROUND

In the field of tracking and navigation, it may be desirable to estimate orientation with respect to the Earth. Global positioning system (GPS) technology, for example, relies on external signals from multiple satellites to triangulate a solution for an approximate position. With limited accuracy and/or availability, GPS may not be suitable for some highly precise applications of navigation or tracking, such as, for example, determining precise azimuth, and may at times be unavailable due to various circumstances such as blocked, distorted, or otherwise unavailable signals.

One possible way to overcome the unavailability of external aiding sources such as GPS is the use of instrumentation that measures the strength and direction of naturally occurring magnetic fields, such as a magnetometer. Magnetometers may be used for tracking and navigation, and among other things, making azimuth measurements by measuring the weak magnetic field of the Earth. However, magnetometers are prone to error sources such as ferrous metallic objects or strong electric currents that can cause strong magnetic field distortions.

To this end, it may be desirable to provide a system that enables the determination of the orientation of a body to the Earth using sources other than GPS and/or magnetometers. Orientation may be relative to true north, or azimuth, and may include, for example, latitude, longitude, and/or measurements for bank angle and elevation angle with respect to a reference surface of the Earth.

It may also be desirable to determine with the azimuth, bank angle, and/or elevation of a stationary fixture with respect to the Earth using observations of celestial bodies, such as, for example, the Sun, the moon, stars, and/or planets. Further, it may be desirable to use detectable celestial bodies to determine the position and/or attitude of an object remote from a location of a stationary fixture, by determining any one or more of the longitude, latitude, azimuth, and/or elevation angle of the remote object with respect to the Earth or with respect to celestial bodies.

It may also be desirable to provide a system that determines the orientation of a fixture relative to the Earth, and determines the position, attitude, and/or heading using detectable celestial bodies. For example, a vehicle may use detectable celestial bodies to determine any one or more of longitude, latitude, azimuth, elevation angle, and/or bank angle of a vehicle at rest. It may also be desirable to provide a system and method for aiding navigation of a vehicle during travel.

SUMMARY

In one aspect, a system for determining the orientation of a fixture relative to the Earth includes a fixture configured to be coupled to a structure. The system further includes at least one sensor coupled to the fixture. The at least one sensors is configured to detect a celestial body and provide signals indicative of a plurality of positions of the detected celestial body relative to the at least one sensor over a period of time. The system also includes a processor configured to receive the signals from the at least one sensor. The processor is also configured to receive information relating to a time and date associated with the period of time during which the celestial body is detected. The processor is further configured to receive information relating to an expected relationship between the detected celestial body and the Earth at the time and date. The processor is also configured to determine the orientation of the fixture relative to the Earth based on the signals from the at least one sensor, the information relating to the time and date, and the information relating to the expected relationship between the detected celestial body and the Earth at the time and date.

According to another aspect, a method for determining orientation of a fixture relative to the Earth includes detecting a celestial body via a sensor. The sensor is configured to provide signals indicative of a plurality of positions of a detected celestial body relative to the sensor over a period of time. The method further includes obtaining information relating to a time and date associated with the period of time during which the celestial body is detected, and obtaining information relating to an expected relationship between the detected celestial body and the Earth at the time and date. The method also includes determining the orientation of the fixture relative to the Earth based on the signals from the at least one sensor, the information relating to the time and date, and the information relating to the expected relationship between the detected celestial body and the Earth at the time and date.

According to yet another aspect, a portable structure includes a mount, a fixture configured to be coupled to the mount, and a system for determining orientation of the fixture relative to the Earth. The system for determining orientation of a fixture relative to the Earth includes a fixture, at least one sensor coupled to the fixture, with the at least one sensor being configured to detect a celestial body and provide signals indicative of a plurality of positions of a detected celestial body relative to the at least one sensor over a period of time. The system further includes a processor configured to receive the signals from the at least one sensor, receive information relating to a time and date associated with the period of time during which the celestial body is detected, receive information relating to an expected relationship between the detected celestial body and the Earth at the time and date. The processor is further configured to determine the orientation of the fixture relative to the Earth based on the signals from the at least one sensor, the information relating to the time and date, and the information relating to the expected relationship between the detected celestial body and the Earth at the time and date.

BRIEF DESCRIPTION OF THE DRAWINGS

The accompanying drawings are incorporated in and constitute part of this specification. The drawings illustrate exemplary embodiments, and together with the description, serve to explain some principles of the various embodiments.

DESCRIPTION OF EXEMPLARY EMBODIMENTS

An exemplary system for the orientation of a fixture relative to Earth may include measurements of spatial behaviors, for example, azimuth, elevation angle, and bank angle. While the following exemplary embodiments are described using terms normally associated with spherical and horizontal coordinate systems, other coordinate systems may be used to describe the spatial relationship of a fixture relative to the Earth.

Figure 1A:
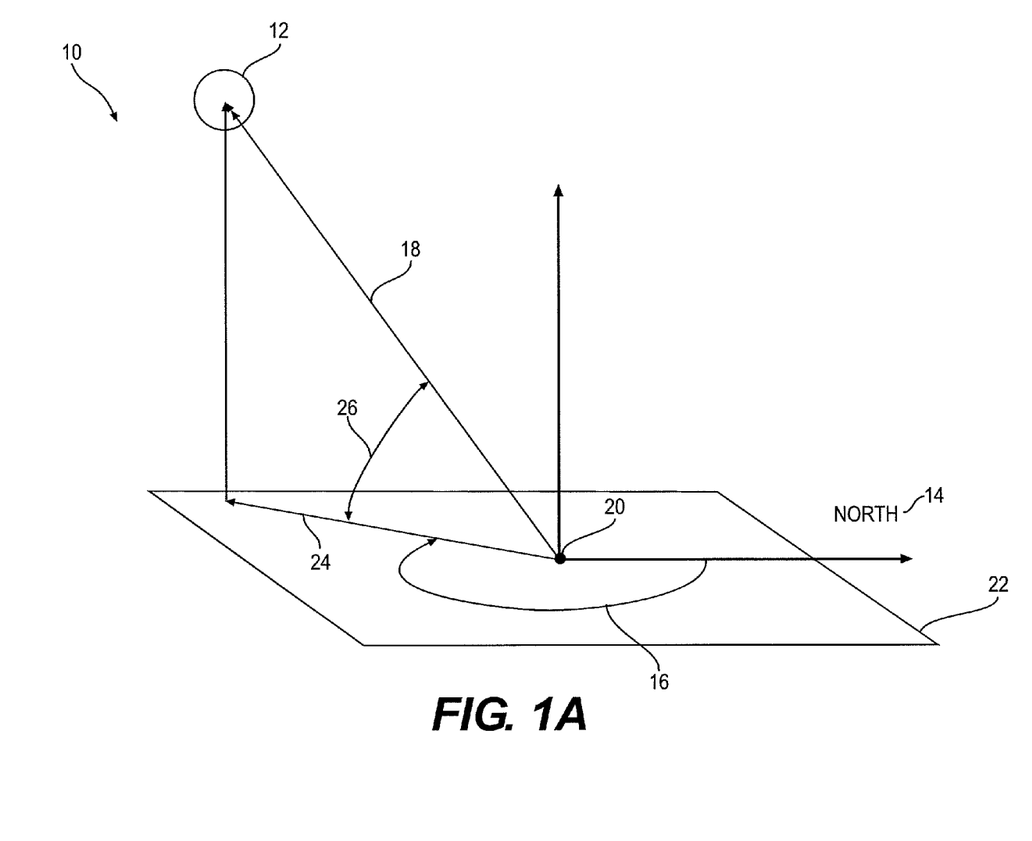
FIG. 1A depicts an exemplary embodiment of a fixture oriented to the Earth with respect to azimuth and elevation angle.

As depicted FIG. 1A, a description of a point of interest 12 relative to true north 14 may be desirable for describing the orientation of a fixture relative to the Earth. Azimuth 16 is an angular measurement in a spherical coordinate system 10 in which a unit vector 18 from an observer 20 to a point of interest 12 is projected perpendicularly onto a reference plane 22. The angle, normally measured in degrees, between the projected unit vector 24 and true north 14 is called azimuth 16. The azimuth is normally measured in the direction from north to east. For example, the point of interest may be a body or object, and a reference plane may be the surface of the Earth. The elevation angle 26 may also be desirable for the orientation of a fixture relative to the Earth. The elevation angle 26 is formed by the unit vector 18 originating from the observer 20 and the projection of the unit vector 18 on the reference plane 22.

Figure 1B:
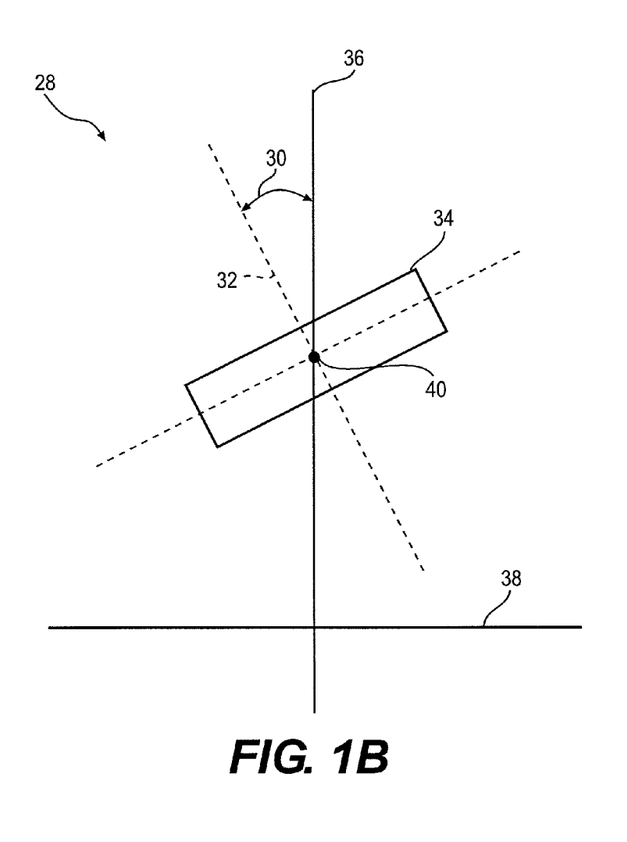
FIG. 1B depicts an end view of a fixture illustrating a bank angle of the fixture as the fixture is oriented relative to the Earth.

Referring now to FIG. 1B, a bank angle 30 is depicted. Bank angle 30 is the angular difference from the vertical axis 32 of a reference object 34 with respect to a line 36 perpendicular to a reference plane 38. The reference plane 38 may be the observer's horizon. FIG. 1B shows an end view of a reference object 32 rotated along its long axis 40 by the bank angle 30.

Figure 2:
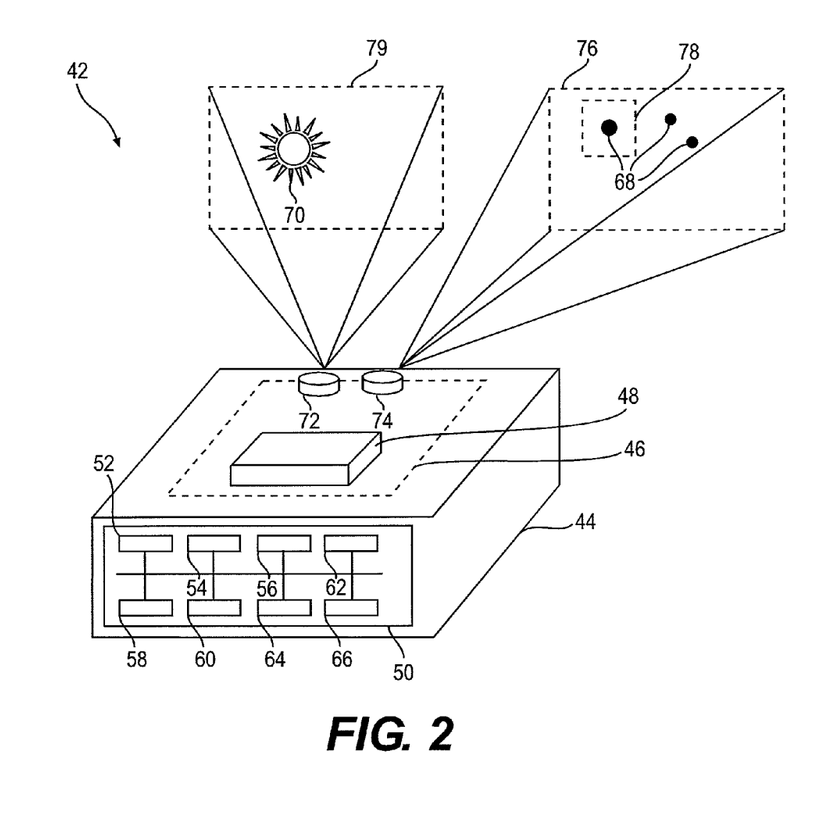
FIG. 2 is a schematic depiction of an exemplary embodiment of a fixture showing an exemplary arrangement of sensors configured for detecting celestial bodies.

FIG. 2 schematically depicts an exemplary embodiment of a system 42 for determining the orientation of a fixture relative to the Earth. The exemplary system 42 includes an exemplary configuration of one or more sensors 46 arranged on a fixture 44. The fixture 44 may be configured to be attached to a mount for attaching to a structure (the mount and structure is not shown in FIG. 2), or may configured to be operable without being attached to a structure. According to some embodiments the structure may be portable, for example, a frame or other structure that is movable by hand, a motorized vehicle, or the like.

The exemplary embodiment of system 42 shown in FIG. 2 includes a processor 50, which may include one or more of a central processing unit (CPU) 52, read only memory (ROM) 54, random access memory (RAM) 56, non-transitory computer memory 58, display adaptor 60, a wired and/or wireless network adaptor 62, a system clock including a real time clock 64, and internal or external digital storage 66.

In accordance with some embodiments, the system 42 may use one or more sensors 46 to detect celestial bodies to determine orientation of the fixture 44 relative to the Earth. The sensors 46 may include one or more imagers such as digital cameras, electro-optical cameras, infrared cameras, and/or any other suitable imagers known to those skilled in the art. Those skilled in the art will appreciate that one of a variety of sensors can be used to detect celestial bodies other than the Sun 70 in nighttime conditions, such as an infrared sensor. Imaging sensors typically used for detecting celestial bodies may utilize one or more lenses respectively calibrated to each attached sensor. The sensors 46 may also be incorporated into a sensor bank 48, where the sensor bank 48 may include any one or more sensors, such as, for example, accelerometers, inclinometers, gyroscopes, magnetometers, temperature sensors, and/or a GPS receiver.

According to some embodiments, the system 42 may also include a Kalman filter. For example, Kalman filters may be used to reduce and/or eliminate random variations and other inaccuracies in data to provide a more precise orientation solution. For example, a Kalman filter processes streams of "noisy" input data to produce a statistically optimal estimate of an underlying system by keeping track of the estimated state of the system and the variance or uncertainty of the estimate. The estimate may be updated using a state transition model and measurements which estimate the system's state at each time step to provide an accurate orientation solution.

For example, it may be advantageous for the processor 50 to utilize a Kalman filter to operate on data received from one or more sensors 46 to bring the statistical error of multiple data captures from the sensors 46 to as close to zero as practically possible. The propagation of the model may be updated recursively, to give the best model of the underlying system. Utilizing a Kalman filter may improve or optimize the system 42 by mitigating error and may thereby increase the probability of determining true north 14, azimuth 16, elevation angle 26, and/or bank angle 30.

The exemplary embodiment of the system 42 shown in FIG. 2 may detect one or more of celestial bodies 68 and 70. According to some exemplary embodiments, the system 42 may determine the orientation of the fixture 44 relative to the Earth by acquiring an image of detectable light (or other phenomenon) from one or more celestial bodies 68 and 70 using one or more of the sensors 46. The image signal is received by the processor 50, and the image signal may be processed using one or more techniques described herein. Using the processor 50, the image of the one or more detected celestial bodies 68 and 70 is matched with an existing map of celestial bodies that may be stored in the non-transitory computer memory 58 or retrieved from a remote database. The processor 50 may also include a system clock and/or a real-time clock 64, which may provide the system 42 with a calendar day and time. According to some embodiments, using the data received from the sensors 46, the celestial body match data, the day, time, and/or other celestial body data relating to an expected relationship between the detected celestial body 68 and 70 and the time and date, the orientation of the fixture 44 relative to the Earth may be determined.

According to some embodiments, the system 42 may be configured to determine orientation of a fixture relative to the Earth based on celestial bodies during day or night, depending on the more easily detectable celestial bodies. When the Sun 70 is the only detectable celestial body (or more easily detectible celestial body), calculations may be made by the processor 50 after receiving a signal from a sensor 72 configured to detect the Sun 70. According to some embodiments, when celestial bodies other than the Sun 70 are detectable by the system 42, calculations may be made by the processor 50 after receiving a signal from a sensor 74 configured to detect celestial bodies other than the Sun 70. When only the Sun 70 is detectable by the sensor 72, the azimuth 16, elevation angle 26, and/or bank angle 30 may be provided from another sensor from the sensor bank 48, such as, for example, an inclinometer. Those skilled in the art appreciate that a sensor configured to detect the Sun 70 can be one of a variety of sensors such as an imager described previously herein.

It may be advantageous to detect celestial bodies 68 and 70 using the system 42 in a plurality of light conditions. According to some embodiments, a first step in detecting celestial bodies 68 and 70 may include extracting identifiable celestial features from an image captured by one or more of the sensors 72 and 74. As light conditions can vary widely between day and night, different image processing strategies may be used for the daytime 72 and nighttime 74 sensors. In general, monochrome images may be used for both daylight and nighttime conditions to reduce processing time by the processor 50. Additionally, detecting celestial bodies other than the Sun, such as one or more bright stars and/or planets 68 may utilize detection algorithms stored in the processor 50 with three or more different levels of complexity.

According to some embodiments, it may be advantageous to utilize image processing, such as one or more detection algorithms, for nighttime imagery, to accommodate noise that arises from long exposure times as well as obstructions and variations in illumination. The primary components used for detecting stars in a nighttime image to distinguish stars from noise or occlusions may include one or more of the following:

1. Dark frame subtraction which reduces image noise;
2. Mode selection, which determines what regions of the image should be processed according to optimal processing requirements;
3. Celestial body detection, which performs approximate detection of star locations in image regions of interest; and
4. Celestial body centroiding, which refines star detection to sub-pixel accuracy.

When pictures are captured using long exposure times, image noise may become more pronounced and may interfere with celestial body detection and centroiding algorithms. Additionally, some sensors 72 and 74 may contain dead pixels that are non-responsive to light and remain stuck at a black level. Raw images obtained from the nighttime image sensor 74 may be corrected before being passed on to the processor 50 for star detection and centroiding. Dead pixels may be corrected by interpolation using information from neighboring pixels, and sensor noise may be mitigated by correcting for fixed-pattern noise. Fixed pattern noise is the component of the sensor noise that is consistent from shot to shot and includes hot pixels that appear to be stuck at a higher intensity value.

Fixed-pattern noise correction may use a dark frame subtraction to reduce the effects of sensor noise during longer exposure times and from higher gain settings. Dark frame correction works by capturing a dark frame where the sensor 74 is exposed to no external light (such as with a lens cap covering the lens) in order to identify the fixed-pattern noise, and then removing this noise from the image. Dark frame information may be obtained offline during calibration and may be stored in the processor 50 (e.g., in non-transitory memory) for use during runtime. However, fixed pattern noise varies with exposure setting and temperature, so it may be advantageous according to some embodiments for dark frames to be recorded for these different configurations during calibration. The dark frame correction may include storing the full resolution gray scale dark frame image. During runtime, the image captured from sensor 74 may be corrected by subtracting the dark frame values from each pixel.

It may be desirable to correct hot and dead pixels by averaging the intensity values of neighboring pixels. Identifying before runtime, that is, before the system 42 is operational in the field, which pixels in the image are hot or dead during calibration may be advantageous. Dead pixels can be identified by illuminating the sensors 72 and 74 such that all pixels are saturated. Thereafter, any pixels that fall below a certain threshold may be identified and stored. Additionally, dead pixels should not be temperature dependent, so dead pixel identification may be performed at a single nominal temperature. Hot pixels may be identified in a similar fashion offline during calibration, but by using the appropriate dark frame image for the current exposure setting and temperature. For each stored dark frame image, the hot pixels may be identified as any pixels in the dark frame image that exceed a certain threshold value.

During runtime, the dead pixel information and the hot pixel information may be combined to identify any bad pixels that require interpolation for correction. This may typically be performed on startup as well as when the exposure settings change, or when the temperature has changed substantially. With regards to selecting which temperature dark frame image to choose, the temperature may be rounded up to the next highest temperature. For example, if dark frame images are recorded for every 10 degrees C., then for a 22 degrees C. operating temperature, the 30 degrees C. dark frame may be selected instead of the 20 degrees C. darkframe. The bad pixel information may be constructed by combining the dead and hot pixel data.

Note that the above implementation may be optimized for speed over memory since it stores a two-dimensional array of the bad pixel locations as well as a binary image map that indicates which pixels are bad. This redundant data may eliminate the need to perform a search through either array to determine which pixels are bad. Additionally, note that it may be advantageous for the interpolation of bad pixels to occur after the aforementioned dark frame subtraction.

According to some embodiments, one or more of a plurality of primary nighttime star detection modes may be used by the system 42 to improve or optimize the performance of the celestial body detection algorithm. Each of the plurality of star detection modes offers a distinct level of processing requirement and net benefit to the detection process. For example, a first mode of celestial body detection may use a scaled down processing algorithm that down-samples sensor data to reduce processing time. In the first down-sampled mode, the image may be scaled down in size using a method known for down-sampling images. By processing a lower resolution image, the star detection time may be reduced. The first down-sampled mode may be useful when no initial estimates of the attitude of the fixture 44 (at least, the azimuth 16) relative to the Earth are available and a faster computation time is desired. However, the robust detection of some celestial bodies 68 may be sacrificed due to the inherent loss of information from image down-sampling.

In an exemplary second mode of celestial body 68 detection, the region of interest (ROI) mode, may be utilized when an estimate of the system 42's azimuth 16 relative to the Earth is available. By passing the expected unit vectors 18 to the stars 68 in the camera frame 76 as inputs to the star detection algorithm, the expected pixel locations of the stars in the image may be computed. A region of interest 78 (see FIG. 2) in the full resolution image can then be defined around each expected star pixel location and these sub-images can be processed for star detection so that the whole image does not need to be processed.

A third full-resolution mode of celestial body detection acts as a backup mode when no attitude information for the system 42 is available and the first down-sampled mode fails to match the minimum number of celestial bodies 68 after a number of tries as determined by the celestial body matching algorithm. In this embodiment, the full resolution image may be processed in its entirety to increase the probability of an affirmative celestial body detection.

Template matching may be used to identify regions of the measurement image 76 that resemble a celestial body 68. The inputs to the template matching function may include the template image 76 and the portion of the full resolution dark frame corrected image that is to be processed. The image to be processed could either be the entire full resolution image 76, or it could consist of a region of interest 78. The result of the template match may then be thresholded to identify candidate regions, and then reasonability checks may be performed on the result binary shapes to eliminate false detections.

The template image is a representative image of a celestial body 68, described herein for the purpose of explanation as a star, that is stored in the processor 50 (e.g., in non-volatile memory) and remains constant throughout the celestial body 68 detection algorithm. To simplify the implementation and avoid any biasing of the results, the template image may have an odd number of pixels in the height and width dimensions with the star properly centered. The selected template star may be symmetric in all directions to once again avoid any biasing of the results. A template may be generated by taking an actual image of a star, blurring it with a Gaussian filter, and performing additional processing so that it exhibits these characteristics. According to some embodiments, the template generation processing may be performed offline ahead of time, so that only the final desired template is saved into memory of the processor 50.

The ROI mode star detection may include defining sub-images 78 for each star expected to be within the sensor's field of view 76. To define the ROIs, the stars that are expected to be within the sensor's field of view first may be determined. The unit vector for each star labeled as being in view may then be transformed into the North-East-Down (NED) frame by first using a transformation algorithm. NED coordinates are known by those skilled in the art for representing state vectors.

After the expected unit vectors 26 to each point of interest 12 are expressed in the camera frame 76, then an intrinsic camera calibration process for converting unit vectors in the camera frame to pixel coordinates may be applied to determine where in the image each star is expected to be located. The region of interest 78 will be a box of fixed size around each expected star pixel location. The list of stars expected to be in the sensor's field of view 76 can then be further trimmed if any of the region of interest lies out of bounds of the minimum and maximum pixel values based on the width and height of the image in pixels.

According to some embodiments, the template matching technique may use a normalized cross-correlation (NCC) metric to detect celestial bodies in a given image. Normalized cross-correlation is described by an equation where the correlation coefficient at a pixel coordinate is a function of the image intensities and the intensities of the template. NCC allows for robust star detection in the presence of variation in background illumination or in the presence of occlusions or image noise. NCC may be evaluated by laying the template over a pixel and evaluating the correlation coefficient for the overlap between the pixel and the template. The template is then shifted over by a pixel to repeat the same calculation until each pixel in the image has been evaluated. Reasonability checks on shape, size, and intensity may then be performed by the processor 50, and the center coordinates of the regions that pass these checks may be output as the pixel coordinates of the detected stars.

According to some embodiments, it may be desirable to determine the centroid of one or more celestial bodies in order to improve the accuracy of the celestial body matching algorithms. For example, some embodiments of the system may use a centroiding algorithm. The goal of the centroiding algorithm is to precisely locate the center of a celestial body 68, for example, a star, to sub-pixel accuracy once the star has passed the reasonability checks. This differs from the previously described star detection, which provides only an approximate measurement which may need to be further refined. From the initial star detection, the star centroiding algorithm expects to receive from the sensor 74 sub-images for each star 68. These sub-images could be defined as pixel locations of the approximate star center and a region of interest 68 around that pixel location.

The star centroiding method described herein may first process the region of interest 68 in the normalized cross-correlation image to define a centroiding window within the region of interest 78. A centroiding window may be defined within the region of interest 78 so that the tightest bounding box that encapsulates the majority of the star 68's detectable light is used for the centroiding calculation. By defining a bounding box, this helps to minimize the effects of bad pixels far from the star center on the centroid calculation. The bounding box identification is performed by the processor 50 by using the normalized cross-correlation image because the normalized cross-correlation method results in a filtered image that is more robust to noise from hot or dead pixels in comparison to the original captured image.

According to some embodiments, for each star sub-image passed on from the initial star detection, the marginals of image intensity in the horizontal and vertical directions may be computed using the normalized cross-correlation image to identify the centroiding window. The marginal in the horizontal direction may be found by summing up the pixel intensities for all pixels in a given column, and similarly the marginal in the vertical direction may be found by summing up the pixel intensities for all pixels in a given row.

This results in a one-dimensional function for each marginal which may be simpler to analyze for centroiding purposes than the two-dimensional array of the image. The overall strategy may be to first find the peak value of the marginal, which should be the maximum value nearby the center. Then the minimum values for the left and right halves of each marginal curve may be obtained. The larger of the two minimums (left vs. right) is selected, and a threshold level is defined based on a percentage difference between the selected minimum and the maximum value for each curve. Finally, the portion of the center of the curve that exceeds this threshold defines the centroiding window.

Additionally, when determining the centroid, it may be desirable to compensate for the background illumination value. Modeling ambient illumination as a uniform bias to all pixels in the local region of the star, this illumination can cause biases in the computed centroid location. Since a center of mass type calculation may be typically used for locating the centroid of a star, the uniform local illumination may be essentially be modeled as adding the center of mass contribution of a uniform plate, thus affecting the centroid calculation. To mitigate this effect, the background level may be identified and subtracted from each pixel. The centroid may be computed using this background corrected image. With the centroiding window defined, the centroid may be then found to sub-pixel accuracy within the trimmed down centroiding window, for example, by means of a first-order moment calculation, where the product and summation are taken over the centroiding window. This may be performed for each detected star to precisely locate their centroids in pixel coordinates.

Note that when in the first down-sampled mode, the centroiding may still be performed using the full resolution image by scaling the detected star location back up to an approximate location in the full resolution image. Similarly, all the index boundaries determined on the marginal may be scaled back up to the full resolution image for background level identification and image trimming in the above centroiding algorithm.

The outputs from the nighttime image processing are unit vectors 18 to the measured stars. According to some embodiments, a conversion is made by the processor 50 from the two-dimensional sensor pixel coordinates output from the centroiding into three-dimensional unit vectors 18 in the sensor reference frame 76. Sensor calibration routines (e.g., camera calibration routines) may provide this conversion and produce unit vectors 18 to the detected stars 68 expressed as components in the reference frame 76.

Daytime images may be far less hindered by noise and occlusions than nighttime imagery due to shorter exposure settings and because physical filtering used to reduce the total amount of incoming light, which also helps to eliminate extraneous objects from the image. However, in spite of these advantages that come from the intensity of the Sun, the centroiding accuracy should be as precise as possible, since the Sun is the only celestial object used during the daytime. Furthermore, it may be advantageous for the methods for daytime image processing to be able to accommodate large dynamic ranges due to the variations in intensity that might occur from high noon to sunset or cloudy days.

According to some embodiments, the detection of the Sun may be performed using a strategy very similar to the thresholding and reasonability checks for the nighttime image processing. The captured daytime image 79 may be thresholded on image intensity and converted into a binary black and white image. This results in a binary image that can be processed using binary shape analysis algorithms. These functions may segment the foreground into separate objects, the properties of which can be analyzed, by labeling contiguous foreground pixels as a single foreground object and counting the total number of foreground objects.

A first-order moment calculation of image intensity around the detected Sun may be used to locate the centroid to sub-pixel accuracy. Straight application of a first-order moment calculation may perform best for the daytime imagery because the distortions for the daytime lens tend to be symmetric, and furthermore, there are unlikely to be additional objects in the image with the fast exposure and heavy physical filtering.

Occluded Sun images may additionally be rejected by analyzing the horizontal and vertical image intensity marginals of the captured image. Similar to the nighttime star detection algorithm, the marginal in the horizontal direction may be found by summing up the pixel intensities for all pixels in a given column, and similarly the marginal in the vertical direction may be found by summing up the pixel intensities for all pixels in a given row. Note that the exemplary nighttime star detection algorithm used the marginal of the normalized-cross correlation image. However, in the exemplary daytime Sun detection algorithm, the regular image (after any fixed pattern noise correction) may be used.

Whether a Sun image is valid or not may be determined by analyzing the kurtosis of the marginal after biasing the marginals by their respective minimum values. Kurtosis is a measure of the peakedness of a distribution and may be determined as the ratio of the fourth moment about the mean to the square of the variance. In other words, higher kurtosis for a distribution means more of the variance is due to larger but infrequent deviations, as opposed to more frequent but modestly sized deviations.

According to some embodiments, the same (or similar) algorithm used for nighttime sub-pixel centroiding may be adapted to work for the daytime as well. One difference is that the marginal may be computed on the regular image as opposed to the NCC image. The use of the regular image as opposed to the NCC image may simplify the implementation since shifting between NCC and regular image no longer needs to occur.

According to some embodiments, detecting one or more celestial bodies 68 to determine the orientation of a fixture 44 relative to the Earth may include utilizing a star matching algorithm. The primary function of the star matching algorithm is to search for a unique match between the configuration of the detected celestial bodies and known configurations of celestial bodies stored within the memory of the processor 50. The star matching algorithm may reference one or more celestial databases, which are described hereafter in greater detail. As an initial step, according to some embodiments, the star matching algorithm generally operates by matching all inter-star angles between the detected celestial bodies within a K-point polygon. The parameter K may be determined in advance based on the count of stars in the database, the field of view, expected centroid accuracy, and the star match confidence threshold. If K or more centroid measurements are available, the algorithm initially sorts the measurements so that close-proximity stars are at the end of the list. These stars 68 can easily be erroneously matched by a triangle-matching function stored in the system 42, so they are excluded from the triangle list. Next, the algorithm may select an initial candidate triangle of three measurements and may attempt to create a K-point polygon from there. This strategy may maximize the variation of the measurement indices from one trial to the next, such that a single spurious measurement in either of the outer loops will not waste excessive processing time by the processor 50.

Candidate triangles may be checked for co-linearity. A triangle may be discarded if any angle of the projected triangle is less than a predetermined threshold, as a collinear geometry enables false matches. The triangle-matching function may next test for a unique match. If the algorithm is unable to positively match K stars after exhausting all candidate triangles, then it returns a failed status and no star catalog entries.

When the azimuth 16 of the fixture 44 is known relative to the Earth, then the celestial body matching will only consider stars 68 that are expected to be within the field of view of the sensor being used. According to some embodiments, this may be performed by transforming the unit vector 18 of the sensor focal axis into the reference frame, and then looping through all stars in the database to determine which stars are within the field of view by checking their relative angles with respect to the sensor focal axis.

This loop may label which stars have the possibility of being within the sensor's field of view (FOV) 76. The minimum cosine angle value threshold value depends on the sensor's FOV 76 and may be determined by taking the widest dimension of the sensor 74 and padding on some additional degrees to act as a buffer.

Once the stars in view have been identified, they may then be expressed as vectors in the NED frame by using a mathematical function to obtain the topocentric azimuth 16 of the fixture 44 and zenith distance for the stars, and then using these angles to obtain the NED unit vectors.

When the full azimuth 16 of the fixture 44 is not known, the stars considered for matching can still be narrowed down by considering stars above the horizon. This can be done using the same method as above by assuming that the sensor 74 is pointing straight at the zenith and to calculate as though the sensor has a full 180 degree-field of view.

A catalog of celestial objects may be stored in the memory of the processor 50 for constellation matching and attitude determination. Note that the Star Ephemeris Database, which is stored on the system 42, is never modified, while the reference star catalog and the Pair Database, which are also stored on the system 42, must be updated at least annually due to celestial body motion. This transformation accounts for the proper motion of the stars, parallax due to Earth's position, gravitational light-bending, aberration due to Earth's motion, and the precession/nutation of Earth's axis. These effects are slowly changing, so more frequent updates may not be necessary. The reference star catalog may be transformed to a searchable database that allows potential star pairs to be rapidly identified, given an input angle. The database may be pre-constructed based on lens and camera specifications, and saved in permanent memory. The database may also be periodically updated to compensate for star motion.

Information relating to the expected relationship between the detected celestial bodies and the Earth may be stored in the system 42. For example, the stored relational information may be used to indicate the expected position of one or more celestial bodies on a particular date and time with respect to the Earth.

There may be instances in which it is advantageous to determine the orientation of the fixture 44 using a variety of known information. For example, according to some embodiments, determining the orientation of a fixture 44 with respect to the Earth may include determining one or more of the azimuth 16, elevation angle 26, and/or bank angle 30 of the fixture 44. In the case where none of the three measurements is known, a full attitude solution method can be used, where the azimuth 16, elevation angle 26, and bank angle 30 of the fixture 44 are solved (relative to the Earth) simultaneously by the processor 50 when at least three celestial observations are available. According to some embodiments, the star matching may actually use a higher number of stars to be matched for a confident correspondence using the full attitude solution method.

According to some embodiments, elevation angle 26 and bank angle 30 of the fixture 44 relative to the Earth may be known, and azimuth 16 can be determined by the processor 50 from a single celestial observation. For the daytime sensor 72, the azimuth 16 calculation method using known elevation 26 and bank 30 angles may be used since this may be the only method out of the two that can be used for a single celestial observation. The elevation angle 26 and bank angle 30 of the fixture 44 can be obtained from a signal from one or more additional inertial sensors from the sensor bank 48. For the nighttime sensor 74, the optimal method may depend on the number of stars available in addition to the accuracy of the elevation 26 and bank angle 30 estimates and the celestial body 68 centroiding accuracy.

According to some embodiments, the system 42 may determine the elevation angle 26 and/or bank angle 30 of the fixture 44 based on a known azimuth 16, relative to the Earth.

Figure 3:
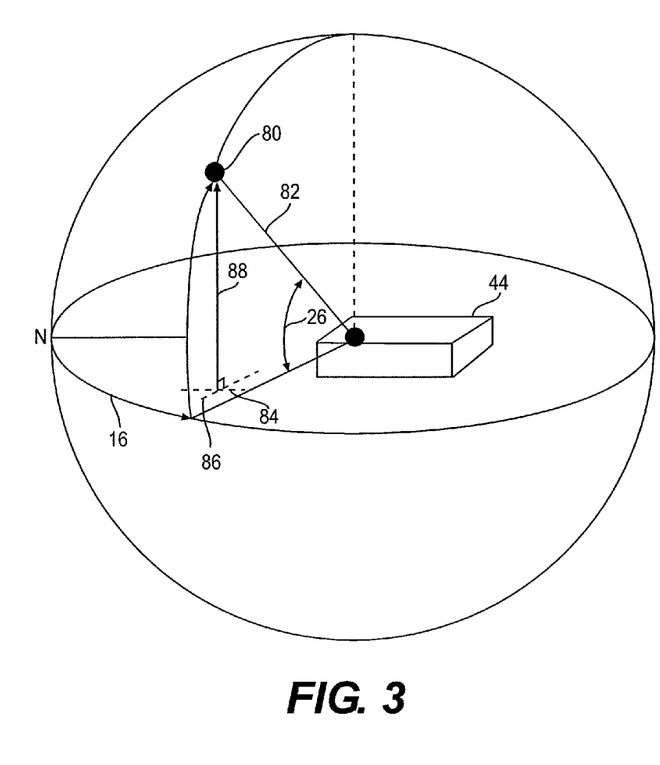
FIG. 3 is a schematic depiction of an exemplary embodiment of a system for determining orientation for use in a targeting system.

According to some embodiments, the fixture 44 may be configured to determine the position of a remote object relative to the Earth, as shown in FIG. 3. Accordingly, the system 42 may be used, at least in part, to identify one or more of the longitude 84, latitude 86, and/or altitude 88 of the remote object 80. The position of the fixture 44 may be known, the location of the fixture 44 may be unknown, then discovered using one or more of the methods described herein as an initial step to determining the position of the remote object 80. In accordance with some embodiments, the system 42 may be used to determine at least one of a difference in longitude 84, latitude 86, and/or altitude 88 of the remote object 80 with respect to the fixture 44. According to some embodiments, the system 42 may be used to update the state vector of a remote object, or be used to determine at least one of the azimuth 16, bank angle 30, and/or elevation angle 26 of the remote object 80 with respect to the Earth.

In accordance with some embodiments, the fixture 44 may be permanently or removably fixed to a mount, where the mount is configured to attach to one or more types of surfaces and/or structures. For example, according to some embodiments, the mount may be configured to attach to a stationary structure, where the fixture 44 is meant to be stationary. In some embodiments, the fixture 44 is configured to be attachable to a mount, where the mount is configured to be attached to a portable structure. Yet other embodiments may provide a fixture 44 attached to a mount that is interchangeably attachable to a stationary structure and a movable structure.

Figure 4:
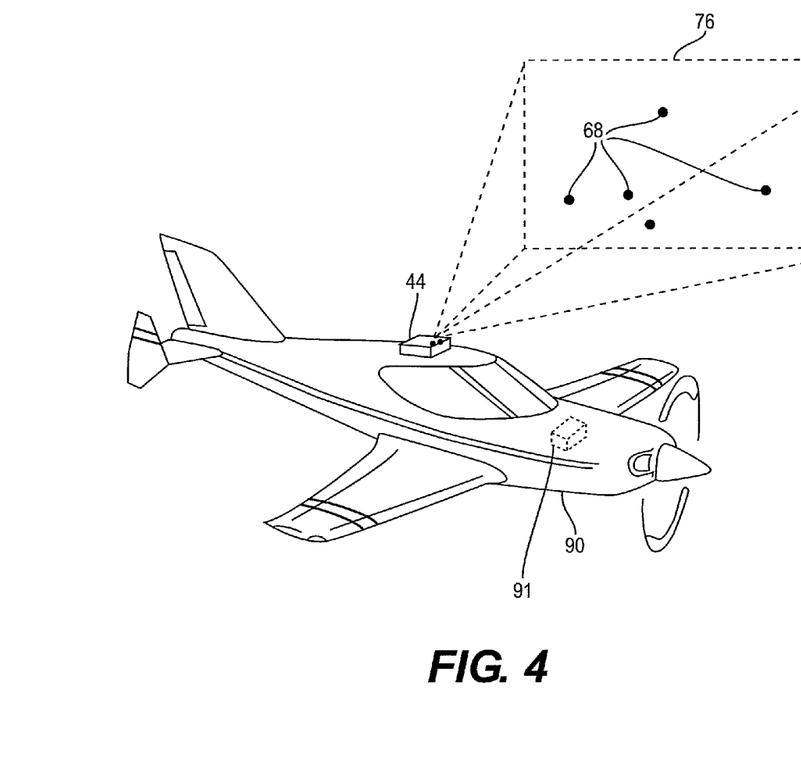
FIG. 4 is a schematic depiction of an exemplary embodiment of a system for determining orientation and an exemplary vehicle.

FIG. 4 shows an exemplary embodiment of a fixture 44 coupled to a portable mount such as a vehicle 90. The exemplary vehicle 90 shown in FIG. 4 is an aircraft. The system 42 may be coupled to other vehicles, such as, for example, a watercraft or automobile. As shown in FIG. 4, the system 42 is fixed to an area of the vehicle 90, which when in flight, allowing a view of the sky. According to some embodiments, celestial bodies 68 may be detected, and the system 42 determines at least one of heading, velocity, azimuth 16, bank angle 30, and elevation angle 26 of the fixture 44 (and thus the vehicle 90) with respect to the Earth using the system 42. According to some embodiments, the latitude and longitude of the fixture 44 is initially known. In yet other embodiments, the initial latitude and longitude may be determined using the system 42. The information may thereafter be supplied to a navigation system 91 of the vehicle 90 to update the navigation state vector of the vehicle 90.

In accordance with some embodiments, the system 42 may determine at least one of heading, velocity, azimuth 16, bank angle 30, and elevation angle 26 of the fixture 44 with respect to the detected celestial bodies 68 using information relating to the expected relationship between the detected celestial body and the Earth at the time and date. According to some embodiments, the latitude and longitude of the fixture 44 may be initially known. In some embodiments, the initial latitude and longitude may be determined using the system 42. The information is then supplied to the navigation system 91 of the vehicle to update the navigation state vector of the vehicle 90.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for determining orientation of a fixture relative to the Earth, the system comprising:
    a fixture configured to be coupled to a structure;
    at least one sensor coupled to the fixture, the at least one sensor comprising an imaging device and being configured to detect a celestial body and provide signals indicative of a plurality of positions of the detected celestial body relative to the at least one sensor over a period of time, wherein detecting a celestial body comprises receiving an image from the imaging device, and identifying candidate regions of the image and eliminating false detections by comparing the image to a template image;
    a Kalman filter; and
    a processor configured to:
    receive the signals from the at least one sensor,
    receive information relating to a time and date associated with the period of time during which the celestial body is detected,
    receive information relating to an expected relationship between the detected celestial body and the Earth at the time and date, and
    determine the orientation of the fixture relative to the Earth based on the signals from the at least one sensor, the information relating to the time and date, and the information relating to the expected relationship between the detected celestial body and the Earth at the time and date,
    wherein the Kalman filter is configured to provide a more accurate orientation determination with respect to the Earth when determining at least one of true north, azimuth, elevation angle, and bank angle.

2. The system of claim 1, wherein the system is configured to determine the orientation of the fixture relative to the Earth according to a first mode during which the Sun is detectible via the at least one sensor and a second mode during which celestial bodies other than the Sun are detectible via the at least one sensor.

3. The system of claim 2, wherein the at least one sensor comprises a first sensor configured to detect the Sun and a second sensor configured to detect celestial bodies other than the Sun.

4. The system of claim 1, wherein the at least one sensor comprises a digital camera.

5. The system of claim 1, wherein the processor is configured to identify a centroid of the detected celestial body and track the centroid during the period of time during which the celestial body is detected.

6. The system of claim 1, wherein the processor is further configured to determine, using the Kalman filter updated at least one time with measurements derived at least in part from said signals from the at least one sensor, at least one of the azimuth, bank angle, and elevation angle of the fixture relative to the Earth.

7. The system of claim 6, wherein the processor is configured to determine a position of an object remote from the fixture relative to the Earth based on at least one of the azimuth, bank angle, and elevation angle of the fixture.

8. The system of claim 1, wherein the processor is configured to detect a plurality of celestial bodies, compare the detected celestial bodies to information relating to known relative positions of celestial bodies at the time and date, and identify the detected celestial bodies.

9. The system of claim 1, wherein the fixture is configured to be coupled to a vehicle comprising a navigation system configured to provide at least one of position, attitude, and heading of the vehicle, wherein the processor is further configured to:
    determine at least one of a position, attitude, and heading of the fixture relative to the detected celestial body;
    determine information related to at least one of a position, attitude, and heading of the vehicle based on at least one of the position, attitude, and heading of the fixture relative to the detected celestial body and the information relating to the expected relationship between the detected celestial body and the Earth at the time and date; and
    supply the information related to at least one of the position, attitude, and heading of the vehicle to the navigation system.

10. A method for determining orientation of a fixture relative to the Earth, the method comprising:
    receiving signals indicative of continuous unfiltered electromagnetic radiation via a sensor;
    detecting, based on the received unfiltered electromagnetic radiation, a celestial body via a sensor comprising an imaging device and configured to provide signals indicative of a plurality of positions of the detected celestial body relative to the sensor over a period of time, wherein detecting a celestial body comprises receiving an image from the imaging device, and identifying candidate regions of the image and eliminating false detections by comparing the image to a template image;
    obtaining information relating to a time and date associated with the period of time during which the celestial body is detected;
    obtaining information relating to an expected relationship between the detected celestial body and the Earth at the time and date, and
    determining the orientation of the fixture relative to the Earth based on the signals from the at least one sensor, the information relating to the time and date, and the information relating to the expected relationship between the detected celestial body and the Earth at the time and date.

11. The method of claim 10, wherein detecting the celestial body via the sensor comprises detecting the Sun when the Sun is detectible via the sensor and detecting a celestial body other than the Sun when the Sun is not detectible.

12. The method of claim , wherein detecting the celestial body via a sensor comprises detecting the Sun with a first sensor and detecting the celestial body other than the Sun via a second sensor.

13. The method of claim 10, further comprising identifying a centroid of the detected celestial body and tracking the centroid during the period of time during which the celestial body is detected.

14. The method of claim 10, wherein detecting the celestial body comprises using a Kalman filter updated at least one time with measurements derived at least in part from said signals from the sensor, and determining at least one of the azimuth, bank angle, and elevation angle of the fixture relative to the Earth.

15. The method of claim 14, further comprising determining a position of an object remote from the fixture relative to the Earth based on at least one of the azimuth, bank angle, and elevation angle of the fixture.

16. The method of claim 10, further comprising detecting a plurality of celestial bodies, comparing the detected celestial bodies to information relating to known relative positions of celestial bodies at the time and date, and identifying the detected celestial bodies.

17. The method of claim 10, wherein the fixture is configured to be coupled to a vehicle comprising a navigation system configured to provide at least one of position, attitude, and heading of the vehicle, wherein the method further comprises:
 determining at least one of a position, attitude, and heading of the fixture relative to the detected celestial body;
 determining information related to at least one of a position, attitude, and heading of the vehicle based on at least one of the position, attitude, and heading of the fixture relative to the detected celestial body and the information relating to the expected relationship between the detected celestial body and the Earth at the time and date; and
 supplying the information related to at least one of the position, attitude, and heading of the vehicle to the navigation system.

18. A portable structure comprising:
 a mount;
 a fixture configured to be coupled to the mount; and
 a system for determining orientation of the fixture relative to the Earth, the system comprising:
  at least one sensor coupled to the fixture, the at least one sensor comprising an imaging device and being configured to detect a celestial body and provide signals indicative of a plurality of positions of a detected celestial body relative to the at least one sensor over a period of time, wherein detecting a celestial body comprises receiving an image from the imaging device, identifying candidate regions of the image, eliminating false detections by comparing the image to a template image;
  a Kalman filter; and
  a processor configured to:
   receive the signals from the at least one sensor,
   receive information relating to a time and date associated with the period of time during which the celestial body is detected,
   receive information relating to an expected relationship between the detected celestial body and the Earth at the time and date, and
   determine the orientation of the fixture relative to the Earth based on the signals from the at least one sensor, the information relating to the time and date, and the information relating to the expected relationship between the detected celestial body and the Earth at the time and date,
   wherein the Kalman filter is configured to provide a more accurate orientation determination with respect to the Earth when determining at least one of true north, azimuth, elevation angle, and bank angle.

19. The portable structure of claim 18, wherein the processor is further configured to determine, using the Kalman filter updated at least one time with measurements derived at least in part from said signals from the at least one sensor, at least one of the azimuth, bank angle, and elevation angle of the fixture relative to the Earth.

20. The portable structure of claim 18, wherein the portable structure comprises a vehicle comprising the mount and a navigation system configured to provide at least one of position, attitude, and heading of the vehicle, wherein the processor is further configured to:
 determine at least one of a position, attitude, and heading of the fixture relative to the detected celestial body;
 determine information related to at least one of a position, attitude, and heading of the vehicle based on at least one of the position, attitude, and heading of the fixture relative to the detected celestial body and the information relating to the expected relationship between the detected celestial body and the Earth at the time and date; and
 supply the information related to at least one of the position, attitude, and heading of the vehicle to the navigation system.

* * * * *